United States Patent [19]

Müller et al.

[11] 3,905,653

[45] Sept. 16, 1975

[54] ANTI-LOCK CONTROL SYSTEM WITH COMMON HYDRAULIC STEP-BY-STEP VALVE

[75] Inventors: Paul Müller, Ziegelhausen; Heinz Leiber, Leimen, both of Germany

[73] Assignee: Teldix GmbH, Heidelberg, Germany

[22] Filed: Oct. 2, 1973

[21] Appl. No.: 402,811

[30] Foreign Application Priority Data
Oct. 2, 1972   Germany............................ 2248266

[52] U.S. Cl............. 303/21 F; 137/599; 188/181 A
[51] Int. Cl.²............................................ B60T 8/06
[58] Field of Search ........ 303/21 F, 7, 21 B, 21 BB, 303/21 BE, 21 P, 61–63, 68–69; 188/181 A, 181 R, 162; 137/599, 625.21, 624.13

[56] References Cited
UNITED STATES PATENTS

| | | | |
|---|---|---|---|
| 2,167,057 | 7/1939 | Safford | 137/625.21 X |
| 2,946,348 | 7/1960 | North | 137/625.21 |
| 3,477,765 | 11/1969 | Perrino | 303/21 F |
| 3,494,671 | 2/1970 | Slavin et al. | 303/21 P |
| 3,606,493 | 9/1971 | Schlitz et al. | 303/21 F X |
| 3,656,816 | 4/1972 | Schlitz et al. | 303/21 F X |
| 3,671,082 | 6/1972 | Stevens | 303/21 F X |
| 3,726,568 | 4/1973 | Krugler, Jr. | 303/21 F |
| 3,731,980 | 5/1973 | Fink et al. | 303/21 F |
| 3,754,797 | 8/1973 | Rodi et al. | 303/21 BE |

*Primary Examiner*—Trygve M. Blix
*Assistant Examiner*—Douglas C. Butler
*Attorney, Agent, or Firm*—Spencer & Kaye

[57] ABSTRACT

An anti-lock control system for the wheel brakes of a vehicle comprises an evaluation circuit responding to the rotary behavior of at least two wheels and a hydraulic step-by-step valve controlled by the evaluation circuit to provide different combinations of pressure gradients in brake channels connected to the wheel brakes.

24 Claims, 10 Drawing Figures

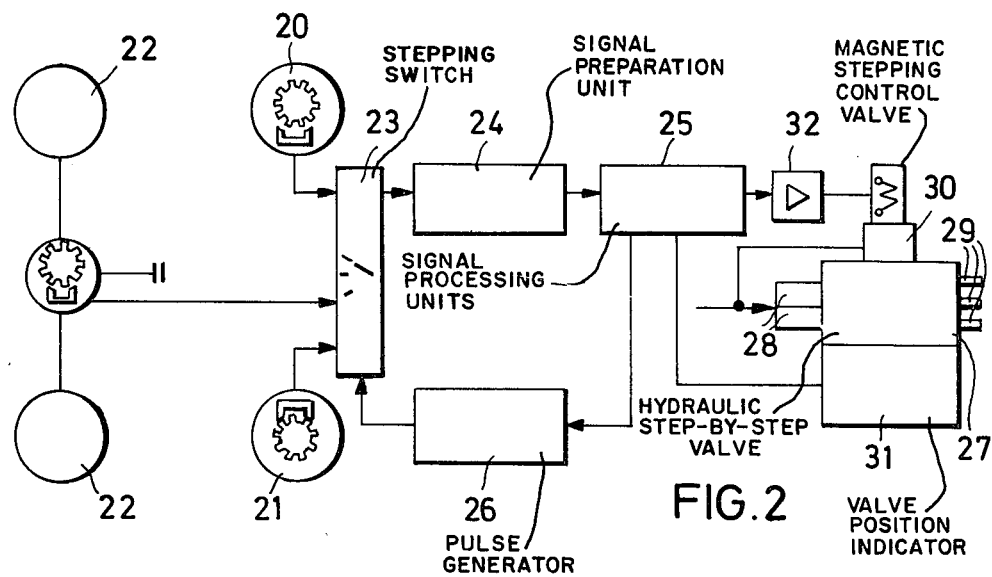
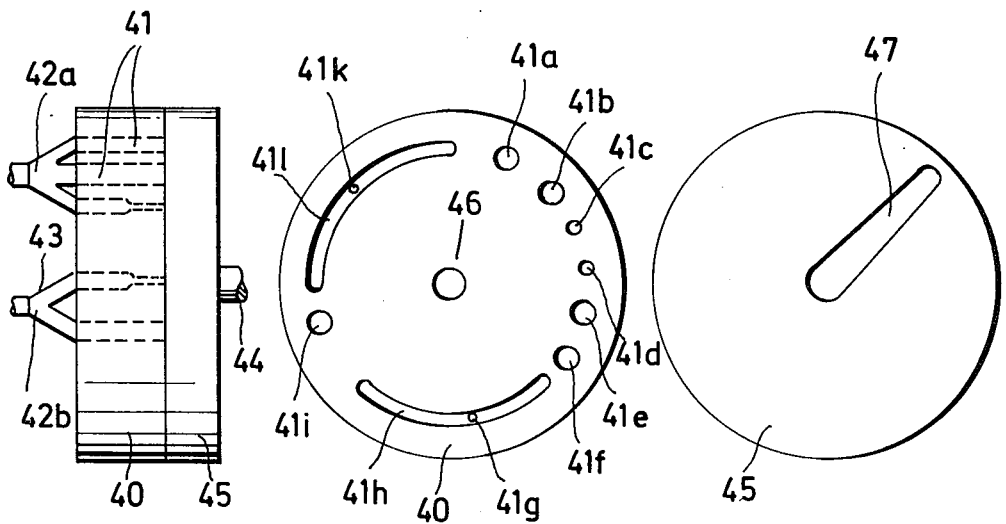
FIG.3a    FIG.3b    FIG.3c 3,905,653

ANTI-LOCK CONTROL SYSTEM WITH COMMON HYDRAULIC STEP-BY-STEP VALVE

BACKGROUND OF THE INVENTION

The invention relates to an anti-lock control system, for the wheel brakes of a vehicle, and more particularly to such a system in which the rotary behavior of at least two wheels is sensed and control signals dependent thereon are produced by means of an evaluation circuit. These control signals control a setting device switched into the braking channels which setting device causes a pressure change according to one of several prescribed pressure gradients for the individual brake channels associated with these wheels.

Such an anti-lock control system is known from the German Accepted Pat. Document No. 1,166,012. The anti-lock control system there has a sensor for each wheel, an associated evaluation circuit, which responds to rotary speed changes, as well as three valves per brake, which valves can be controlled by the evaluation circuit. Normally, the brake pressure, which is produced by a pump, can be built up at the brake without interference, on actuation of a brake lever (rapid rise). With the excitation of a first valve, the brake pressure rise, however, can be restricted (slow rise). By actuating a three-way two position valve the brake cylinder can be disconnected from the brake actuation device and connected to a return line, the flow passage of which is throttled by a throttle (slow pressure drop). Finally, a rapid pressure reduction can be achieved by actuating this throttle.

A disadvantage of this known anti-lock control system, which is intended for aircraft, is the considerable expenditure on the valves, necessary if the control is to be achieved.

It has already become known (Disclosure Document No. 1,914,764) to avoid the large number of valves but at the same time to achieve different pressure gradients by incorporating only one inlet and one outlet valve or only one two-way valve in each pressure channel or line and to excite the valves chronologically by means of pulses, whereby, depending on the pulse ratio selected, different pressure gradients can be achieved. Here too, however, a relatively large number of valves is necessary for one multi-channel control.

SUMMARY OF THE INVENTION

Starting from the fact that, today, anti-lock controllers with excellent control properties are known for vehicles, it is an object of the invention to create a system with generally similar properties to those described above, but which, however, can be produced cheaper and thus facilitate a larger use of anti-lock controls.

According to the invention, there is provided an anti-lock control system for the wheel brakes of a vehicle comprising means for sensing the rotary behavior of at least two wheels of said vehicle, an evaluation circuit for producing control signals, dependent on said sensed rotary behavior of said at least two wheels, a plurality of individual brake channels connected to the wheel brakes of the vehicle wheels and a hydraulic step-by-step valve connected to all said brake channels and controlled in accordance with said control signals produced by said evaluation circuit to provide different combinations of pressure gradients in said brake channels.

BRIEF DESCRIPTION OF THE DRAWINGS

The invention will now be described in greater detail, by way of example, with reference to the drawings, in which:

FIG. 2 shows a second embodiment;
FIGS. 3a to c show the construction principle of a step-by-step hydraulic valve unit which is constructed in a slider-like manner.

DESCRIPTION OF THE PREFERRED EMBODIMENTS

Figure 1:
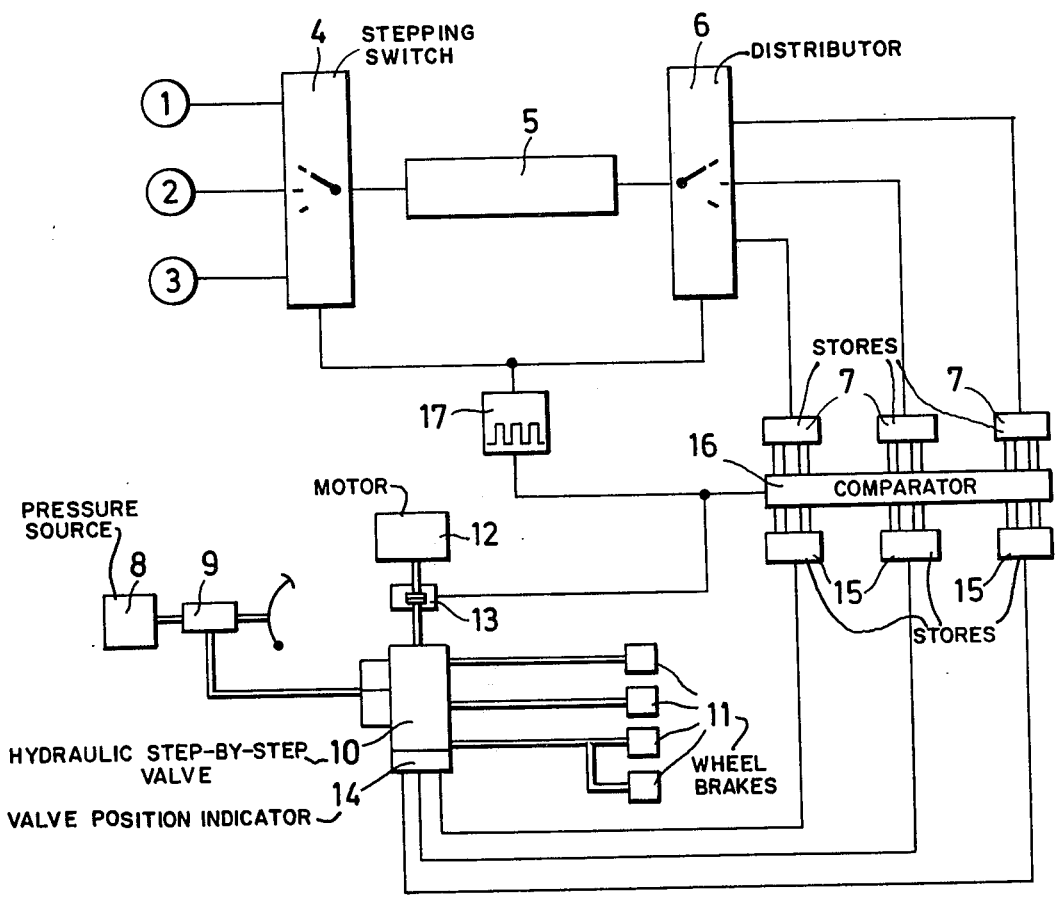
FIG. 1 shows a first embodiment of the invention.

Hydraulic step-by-step valves are known per se. Reference is made to the German Accepted Pat. Documents Nos. 1,600,966 and 1,675,974, in which rotary step-by-step valves having stator and rotor are described. They operate on the principle of connecting several outputs with different inputs according to the switching position of the rotor. The invention is to be seen in the use of such a step-by-step valve for the simultaneous provision of several pressure lines or channels with the pressure gradients as required. By the word pressure gradient should be understood in this case both a pressure rise, keeping the pressure constant (where necessary), and a pressure reduction, wherein the pressure increase and pressure reduction can occur with different slopes.

Different pressure rises may be produced by connecting the lines or channels by means of the step-by-step valve to different pressure sources at different pressures. However, the provision of only one pressure source and a corresponding pressure sink for pressure reduction is desirable and, with this, the different pressure gradients can be produced by connecting the source or sink to the step-by-step valve, by way of paths with different throttle actions. Advantageously the throttle positions are contained in the step-by-step valve itself.

The invention can be realized in different ways. In accordance with one possibility, signals are obtained from the sensor signals associated with all wheels or wheel groups (in the case of common control, e.g. two wheels), the brake pressure of which is controlled by means of the hydraulic step valve unit. These signals relate to certain gradient combinations and thus to the position of the step valve unit. As a result, the step-by-step valve is brought into the corresponding position. If, for example, as in the case of the known system, four different pressure gradients are to be used for each channel in the case of three control channels (i.e. with common rear wheel control) and the system is to be adjustable to all possible gradient combinations, then 64 positions of the step-by-step valve are required. However, if the fact is recognized that after the start of brake control in at least one channel a rapid pressure rise in the channels is not needed 28 positions will be sufficient, of which one position allows a rapid pressure rise in all channels.

Desirably a position switch for detecting the individual positions of the step-by-step valve is connected to the valve and its drive. In the case of the embodiment described, a value, preferably digital, is associated with each valve position, which can be taken off at the position switch. Also the output signals of the evaluation circuit may then represent digital values, which are compared with the digital value of the position switch. In the case of any imbalance, the drive of the step-by-step valve is allowed to run, whereas the drive is stopped when there is identity.

A further reduction in the costs of the system can be achieved if only one evaluation channel is used for the brake pressures to be controlled and the wheel sensors are connected to the evaluation channel cyclically. At the output, output signals generated by the evaluating channel in dependence of the sensor signals occur one after the other, which signals are stored and according to the results present from all the sensors trigger a further movement of the step-by-step valve into the valve position determined by the output signals.

In accordance with another preferred embodiment, the hydraulic step-by-step valve is so designed that, when using n-control channels, it permits, on at least n-1 channels, a small pressure rise in each operative valve position. This expression should also be understood to include maintenance of the pressure constant. Here, with the occurrence of a signal indicating an inclination to lock on the part of one of the wheels, the pressure in the associated channel is controlled by a corresponding change of the pressure gradients until the wheel again enters the stable speed range. During this time, a steady pressure gradient is maintained in the other channels. Only after the control in this one channel has finished can any control in another channel begin if the associated wheel or wheels show a tendency to lock. In order to achieve a quick pressure gradient change, preferably regions of the step-by-step valve (in the case of rotating moving parts of the step-by-step valve, angular regions) are associated with the individual channels, in which regions the openings for the different pressure gradients are located. When the step-by-step valve is so positioned that one region is associated to the corresponding channel the other channels may be connected by continuous connections to a pressure line, which effects a low pressure rise.

Starting again from three control channels with four possible pressure gradients in each channel then inclusive of the starting position in which in all channels, a rapid pressure rise is possible, thirteen valve positions are required, wherein, at any rate, the valve position "slow pressure rise" in all channels occurs three times, corresponding to the number of channels; because of the above mentioned association of regions and channels, it is preferred to provide three equal positions.

Also in the case of this solution, it is advantageous to use only one evaluation channel and to connect the individual sensors, one after the other, to this evaluation channel. Only when sensing a tendency to lock on the part of a scanned wheel is the cyclic connection interrupted and a control of the brake pressure is caused by adjustment of the corresponding valve positions of the step-by-step valve. After the stable speed range has again been achieved, the cyclic connection is again continued. A starting position for rapid pressure rise in all channels can also be provided here in each of the above-mentioned regions and together with the switching of the sensors, the step-by-step valve may be brought into this starting position of the corresponding region. When sensing a tendency to lock, movement is only required to one of the four possible adjacently located positions. Here the step-by-step valve has a total of fifteen positions.

The hydraulic step-by-step valve can carry out a linear movement during operation. That is to say, it can be constructed similarly to a servo valve spool. Preferably, however, it is a multi-pathed servo spool according to the above-mentioned prior disclosures. In the case of a servo valve spool form, the longitudinal movement can be achieved by a hydraulic drive of known construction, the position indicator emitting a signal on reaching the individual switching positions and, if necessary, triggering switching off of the drive. In the case of rotary servo valve spool construction, on the other hand, an electric motor is preferably used as the drive, which can, for example, be a step-by-step motor, controlled by pulses. However it can also be a continuously running motor, which, for example, serves other purposes (e.g. pump drive) and is coupled to the step-by-step valve for further valve movement only for a short time, e.g. by means of a hydraulically actuated clutch.

One pressure source is required in the case of the anti-lock control system in accordance with the invention. A pump is preferably provided for this purpose which, in a known manner, is driven by an electric motor and which is associated with a pressure reservoir connected to the brake valve. Here the arrangement, known in the case of full-power brakes, can be provided with "in-circuit pumping" of the hydraulic fluid. The reservoir is provided on the other hand, in order that a very high output pump is not required and, on the other hand, simultaneously as a reserve in case of a failure of the pump motor. In the case of a two-circuit brake, two reservoirs are provided, of which one is preferably larger and is used for the more important brake circuit.

In the case of this system, the stored energy present can also be used to actuate other units on the vehicle. Thus it can be used for example, for actuating windshield washers, for setting the throttle valve, for steering assistance and actuating other loads or devices.

Referring now to the drawings, in FIG. 1, three brake channels to be controlled are presupposed. It is assumed here that the rear wheels are controlled in common. Accordingly two sensors are provided for the two front wheels and one for the rear wheels. These are suitably rotary speed sensors which are given the reference numerals 1, 2 and 3. The three sensors are connected to a change-over or stepping switch 4, which connects the sensors 1 to 3, one after the other, to an evaluation channel 5. According to the rotary behavior of the wheel, which is presently connected to the channel 5, there is produced an, e.g. digital, output signal, which is fed to one of the stores 7 by means of a distributor 6 operating synchronously with the change-over switch 4. In this store, the output value is stored. If — as already mentioned — four pressure gradients are provided, then in each case, one of the four possible control signals is stored in each store.

The hydraulic circuit of the anti-lock control system comprises a pressure source 8, a pedal-actuated valve 9, which initiates the brake pressure build-up and a three-channel hydraulic step-by-step valve 10, which controls the pressure at the four wheel brakes 11. The step-by-step valve 10 is driven by a continuously running motor 12, which can be coupled to the step-by-step valve by means of a clutch 13; moreover a position indicator 14 is connected to the step-by-step valve 10 which indicator supplies corresponding digital signals to elements 15 as to the position of the step-by-step valve. The three desired signals supplied by the evaluation channel 5 and stored in the stores 7 are compared in a comparator 16 with the three actual signals coming from the position indicator 14. If there is no agreement between these signals, then an error signal is produced which couples the motor 12 to the step-by-step valve 10 and disengages the clutch 13 again only if the gradient combination demanded by the sensors 1 to 3 is set by the step-by-step valve 10, that is to say the position of the step-by-step valve now corresponds to the desired position. At the same time, the error signal can be fed to a pulse generator 17, which provides pulses for the cyclic switchover of the elements 4 and 6, in order to interrupt the cyclic switchover for a short period during the subsequent setting of the step-by-step valve. In the case of this form of embodiment, a plurality of valve positions of the step-by-step valve are necessary as already stated at the outset.

In the case of the embodiment of FIG. 2, the front wheels of a vehicle are given the reference numeral 20 and 21 and the rear wheels 22. The sensors of these wheels are connected to a change-over or stepping switch 23 which normally connects the three sensors one after the other to the evaluation channel comprising a signal preparation unit 24 and a signal processing unit 25. If a signal indicating a tendency to lock is emitted by a connected sensor, then the pulse generator 26 causing the switchover to the other sensors is blocked i.e. the corresponding sensor remains connected.

Of the hydraulic circuit, only the hydraulic step-by-step valve 27 with its three inputs 28 and its three outputs 29 leading to the brakes are shown here. Here a hydraulic valve with longitudinal displacement of the moving parts is used, a hydraulic drive, controlled by the magnetic valve 30 serving for longitudinal adjustment of the valve. If the position of the step-by-step valve 27, indicated by the position indicator 31 and fed thereby to the signal processing unit 25, does not agree with the position demanded by the connected sensor, — this required position being the combination "slow pressure rise" (or also "keeping the pressure constant") in the two other channels not associated with the connected sensor and a pressure gradient dependent on the sensor signal in the channel associated with the connected sensor — then an output signal is produced. This output signal actuates the valve 30 by way of the amplifier 32 and thus displaces the step-by-step valve until the step-by-step valve 27 has reached the correct position. Here with the switchover of the switch 23, it is desirable to displace the step-by-step valve switch 27 roughly into the region assigned to the connected sensor so that only a fine movement of the step-by-step valve with a short path is necessary with the occurrence of a sensor signal.

The construction of the evaluation channels is of no consequence in the case of the two described solutions. It can be based on slip control, delayed acceleration control or a combined control of known construction.

The construction principle and the operation of a step-by-step valve used in the embodiment of FIG. 2 will now be described with reference to FIGS. 3a to 3c.

FIG. 3a shows a side view of a step-by-step valve for one channel, comprising a stator 40, which has ducts 41, to which are connected, for example by means of hose lines 42a and 42b respectively, a pressure source and a pressure sink. A rotor 45 is rotatable together with the rotors for the other channels about the axis 44, and has a radial connection groove 47. The more detailed construction can be seen from FIGS. 3b and 3c, in which are shown views of the surfaces of the stator (FIG. 3b) and rotor (FIG. 3c ) which lie one on the other. The stator 40 is divided into three equal parts, i.e., sectors corresponding to the number of channels. The three openings 41a to 41c are connected to the hose line 42a, that is to say to the pressure source, the opening 41c having a reduced cross-section. The openings 41d and 41e are connected to the pressure sink (line 42b), the opening 41d having again a reduced cross-section. In the next sector is provided an unthrottled opening 41f connected to the pressure souce and a groove 41h extending over a large portion of the sector and connected to the pressure source by means of the opening 41g with a small cross-section (that is to say throttled). The third sector has openings 41 i and 41k and a groove 411 which correspond in structure and connection to the openings 41f and 41g and the groove 41h, respectively, of the second sector. In the center of the stator is found an opening 46 to which the wheel brake cylinder is connected. For the sake of clarity, only the channels 41 corresponding to the openings 41a – e are shown in FIG. 3a.

The rotor 45 has, as FIG. 3c shows, a radially running groove 47, which serves to connect the openings 41a – l to the center opening 46. In the starting position, this groove 47 connects the opening 41a to the center opening 46. The corresponding grooves 47 of the two other rotors 45 then connect openings corresponding to the openings 41f and 41i to the corresponding center connections. The pressure can thus rapidly rise in all channels. In the next switching position the groove 47 connects the opening 41b to the center opening 46 which likewise means a rapid pressure rise. The grooves of the other rotors, now and in the following positions, communicate with the center connections, thus permitting in all these positions only slow pressure rise in the two other channels. On the other hand, in the following valve positions, positions for slow pressure rise 41c, slow pressure reduction 41d and rapid pressure reduction 41e are in register with the groove 47. If control is effected in another channel, then the groove 47 is in register with the groove 41h or 41l. The arrangement for the three channels is so arranged that the control sectors (corresponding to 41 to 41a) are effective in the three channels one after another on rotation of the rotor. The position of the opening 41a, 41f and 41i are provided in order to be able to undertake any coarse adjustment of the step-by-step valve. If it has to be controlled then, only movement over angles smaller than 120° is necessary.

A corresponding step-by-step valve for the form of embodiment of FIG. 1 would need to have only one rotor. Then 64 or 28 channels or openings would have to be provided in the outer periphery of the stator and three output openings would have to be arranged about the center point of the stator. The rotor would then have three rotor grooves staggered by 120°, which grooves select the different pressure gradients in corresponding distribution and connect them to the center openings. Here, in order to achieve all the combinations, the pressure gradients must be correspondingly associated with the openings.

Figure 4A:
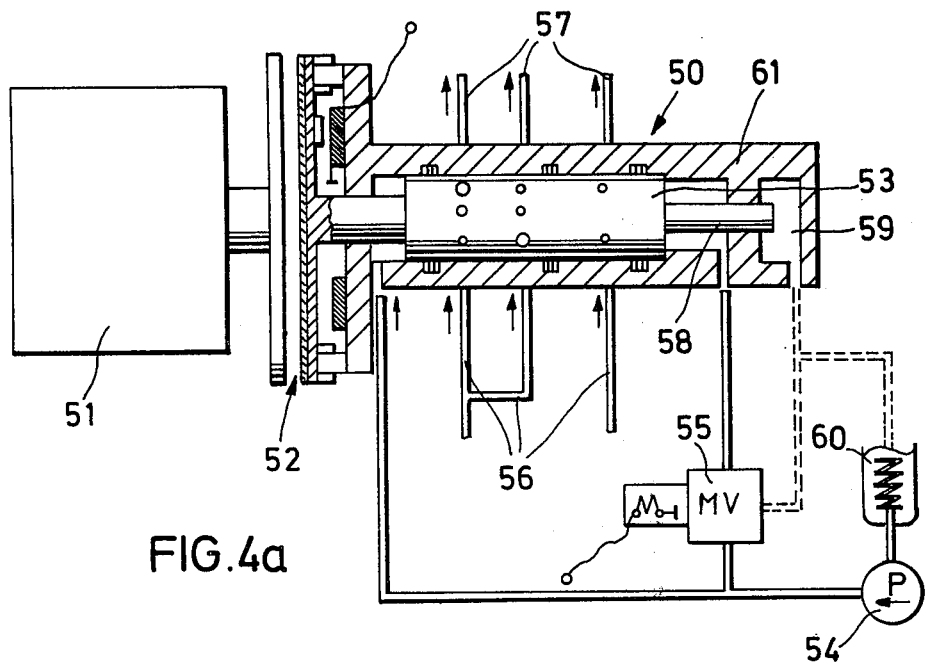
FIGS. 4a and b show a second possible construction of such a rotary slide valve.

FIGS. 4a and b show a further embodiment of a step-by-step valve 50 which is driven by a continuously running motor 51 when a clutch or coupling 52 is engaged. The coupling up is effected hydraulically. Normally, (in the uncoupled state) the pressure acting on the left-hand end of the rotor 53 and produced by the pump 54 moves the step-by-step valve to the right. With opening of the two-way valve 55, the forces on the right-hand end of the rotor 53 are overcome and the rotor 53 is displaced to the left into its coupled state. The rotor 53 is rotated by the motor 51 and thus, in the individual valve positions of the rotor, the output lines 57 are provided with different pressure gradient combinations. The three pressure input lines, divided into two brake circuits, are given the reference numeral 56. The outflow of the pressure medium is effected through a channel lying in the rotor 53 and its shaft 58, and passes into the space 59. From there it is fed into the storage reservoir 60, into which reservoir the pressure medium also flows when closing the two way valve 55.

Figure 4B:
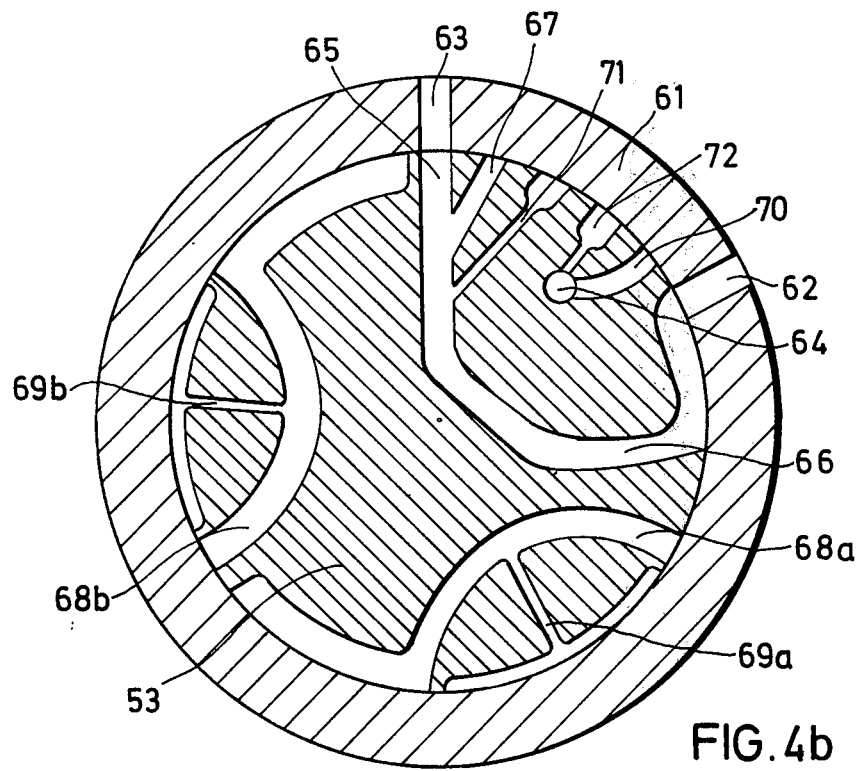

FIG. 4b shows a cross-section taken through the stator and rotor of the step-by-switch of FIG. 4a in the plane, in which the stator and rotor connections for one channel are located. The stator 61 has an input opening 62, to which one of the pressure lines 56 is connected, and an output opening 63, to which the associated output line is connected. An outflow opening 64 is also provided. Here too — as in the case of the emobidment of FIG. 3, fifteen rotor positions are possible. In the position shown, the input 62 is connected to the output 63 through the channel 65/66 in an unthrottled manner, i.e. the pressure can rise rapidly. A rapid pressure boost is possible also for the other brake lines in this position by means of the channels corresponding to the channels 68a and 68b. With like construction of the rotor parts, the inputs and outputs of the other channels corresponding to the inlet 63 and the outlet 62 are rotated about 120°or 240°. In the next position of the step-by-step valve an unthrottled connection exists between the inlet 62 and the outlet 63 through channel 66/67. In the two other brake lines in this and in the following positions, only a throttled pressure rise is possible through the throttle lines corresponing to the throttle lines 69a and 69b. The outlet 63 is connected to the pressure source by means of the throttled path 71 in the third position of the step-by-step valve. In the two following positions, the outlet 63 is connected by means of the throttled line 72 or the unthrottled line 70 to the channel 64 leading to the pressure sink.

Figure 5A:
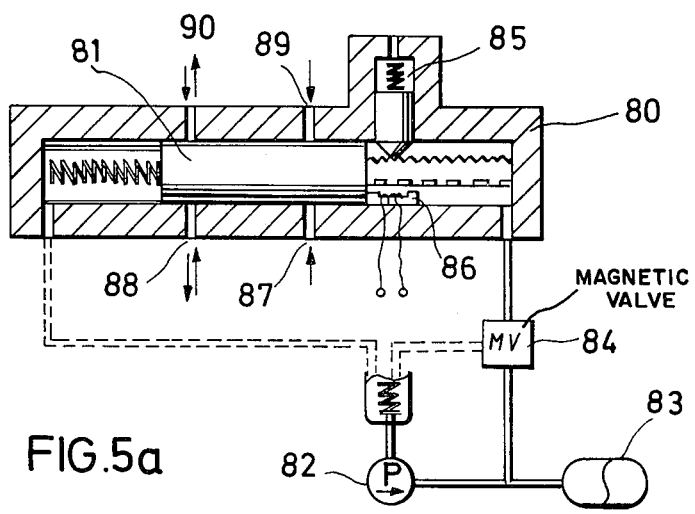
FIGS. 5a and b show a further embodiment of a hydraulic step-by-step valve with longitudinal movement.
Figure 5B:
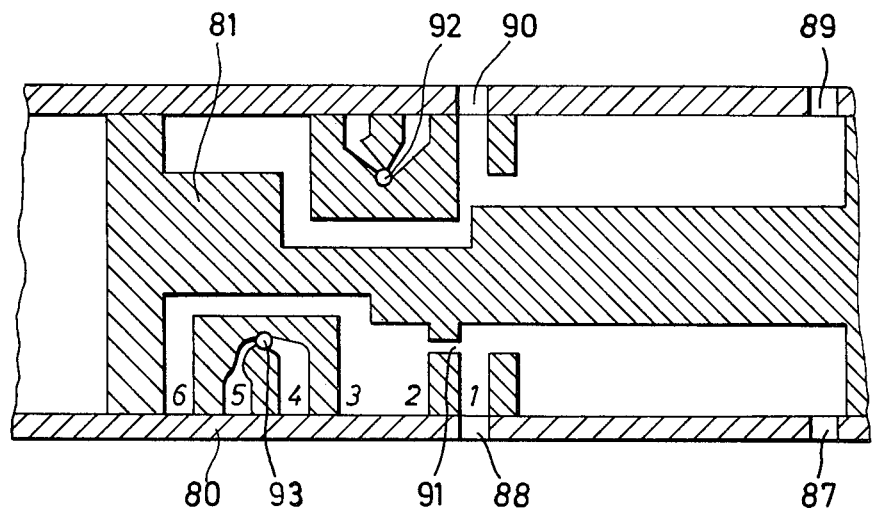

FIGS. 5a and b show a step-by-step valve which is constructed similarly to a servo valve spool. The step-by-step valve is displaced, by a hydraulic drive, in the longitudinal direction, wherein, at any rate, for the sake of simplicity, the pressure is shown controlled only in the two brake lines. FIG. 5a shows a cross-section through the housing 80, which contains the piston 81. The drive of the spool to the left is effected by the pressure built up by the pump 82 in the hydraulic reservoir 83 with a corresponding control operation of the magnetic valve arrangement 84. The piston 81 can move to the right under the action of the spring when the pressure through he magnetic valve arrangement 84 drops. An arrangement 85 is provided for locking the spool in the individual positions and a position indicator 86 is provided to give an indication of the spool position. Openings 87 and 89 are two inlet openings of the two pressure lines for the two brake channels, and openings 88 and 90 are connected to the wheel brake cylinders. FIG. 5b shows the "connection" in the piston 81 for the two brake channels in individual positions.

In the position (1) the piston 81 (shown in section) connects the openings 87 and 89 to the openings 88 and 90 respectively through unthrottled connections. If the piston 81 is moved into the next position, (i.e. 2 is located above opening 88), the pressure in the channel connected to the opening 88 will be increased slowly on account of the throttle 91. On the other hand, the pressure will be rapidly reduced in the pressure channel 90, since the line 92 is connected to the pressure sink. In the next position (3), a further slow pressure rise takes place in pressure channel 88 and the pressure is slowly reduced in the channel 90. Rapid or slow pressure reduction in the channel 88 (line 93 is connected to the sink) is effected in positions 4 and 5 and in each case slow pressure increases take place in the channel 90. Finally the pressure in both channels is slowly increased in position 6.

Figure 6:
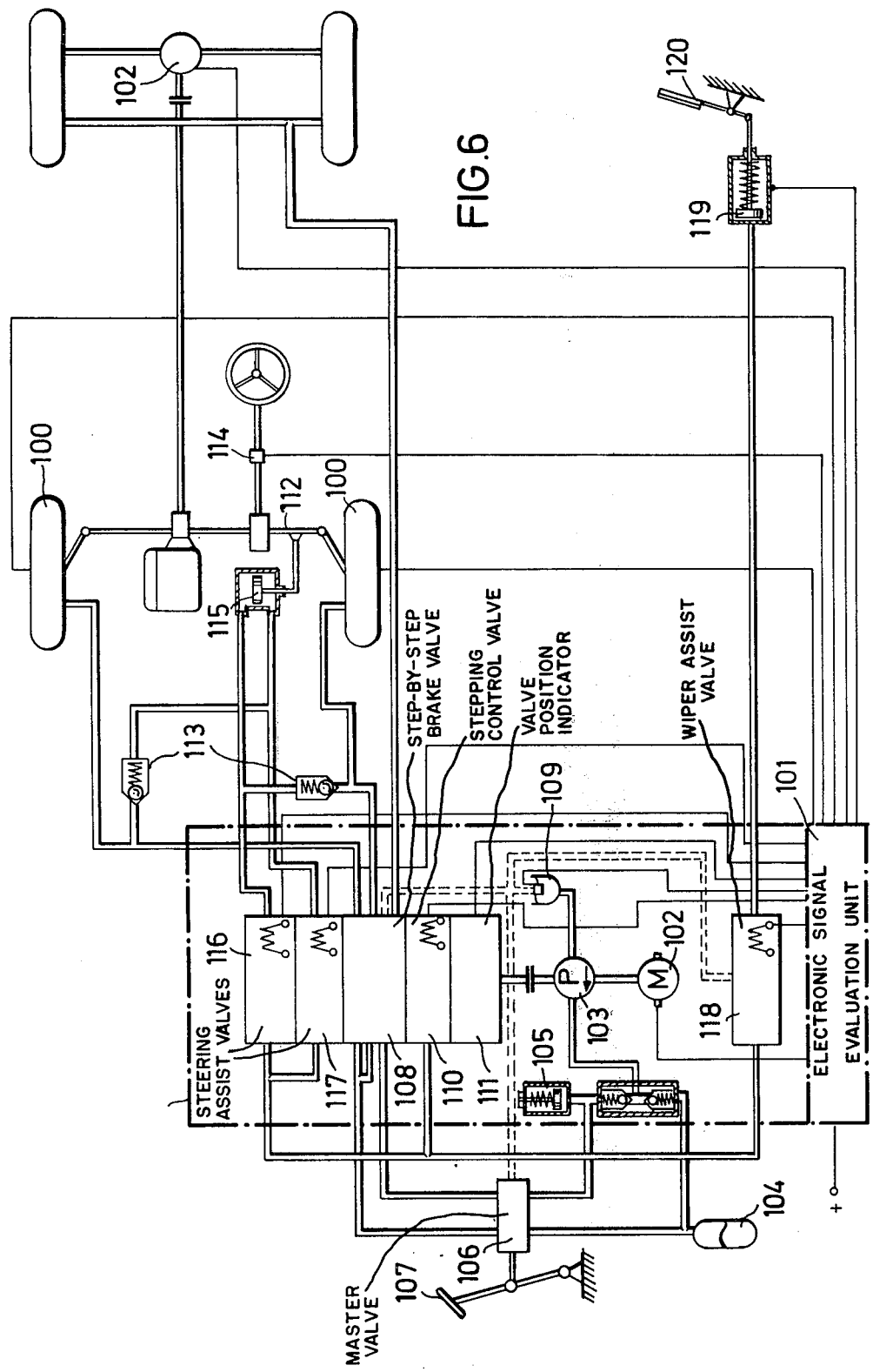
FIG. 6 shows a system which, in addition to braking, supplies still other loads from the same hydraulic circuit.

Finally, FIG. 6 shows a system in which other devices in addition to the brakes are actuated by means of the hydraulic fluid. Front wheels 100 of the vehicle are equipped with rotary speed transmitters (not shown) which are connected by lines to an electronic evaluation unit 101. Similarly a rotary speed transmitter is arranged on the differential 102 of the rear wheels and is connected to the electronic unit 101. A pump 103, driven by a motor 102, pumps the hydraulic fluid from the reservoir container 109 to the larger hydraulic store 104 for the front wheel braking circuit, and to the smaller hydraulic store 105 for the other braking circuit (rear wheels). A pressure is produced which, on actuation of a master valve 106 by means of a brake pedal 107, is applied through a three-channel hydraulic step-by-step valve 108 to the wheel brakes. If a tendency to lock is detected by the electronic unit 101 as a result of signals from the sensors, then a magnetically controlled valve 110 is actuated by the electronic unit and thus the step-by-step valve 108, together with the position indicator 111, is coupled to the motor 102. The position indicator 111 indicates the position of the step-by-step valve to the electronic unit 101, in which unit the desired position of the valve is compared with the actual position; when correspondence is reached, the step-by-step valve 108 is again uncoupled.

The brake pressures at the two front wheels act on the piston 115 connected to the steering linkage 112 by means of non-return valves 113, that is to say laterally oppositely. As a result of this, in the case of different brake presssures at the wheels, compensation of the forces acting on the steering as well as of yawing moments is achieved. If an actuation switch 114 is additionally provided in the steering column, which switch makes contact in one or other direction on rotation of the steering wheel, and thus actuates one of the valves 116 or 117 through the electronic unit 101, actuation of the steering wheel is assisted, since the pressure of the store 104 acts on the appropriate side of the piston 115 and concomitantly adjusts the steering.

In addition a further valve 118 is provided for the actuation of a piston 119, which moves the windshield wipers 120 in one direction. When the valve 118 is switched off, a spring moves the piston back again.

It will be appreciated that the above description of the present invention is susceptible to various modifications, changes and adaptations.

What is claimed is:

1. An anti-lock control system for the wheel brakes of a vehicle comprising: means for sensing the rotary behaviour of at least two wheels of said vehicle; an evaluation circuit means, responsive to the output signals from said sensing means, for producing control signals dependent on said sensed rotary behaviour of said at least two wheels; a plurality of individual brake channels connected to the wheel brakes of the vehicle wheels; a hydraulic step-by-step valve connected to all of said brake channels, said step-by-step valve having different passages for each of said brake channels which permit the variation of pressure with different selected gradients in each associated brake channel, and having different combinations of pressure gradients for said plurality of brake channels in its individual stepping positions; and means, responsive to said control signals produced by said evaluation circuit means, for adjusting the stepping position of said step-by-step valve to provide the desired different combinations of pressure gradients in said brake channels.

2. An anti-lock control system as defined in claim 1 wherein: said sensing means include sensors for sensing the rotary behaviour of said at least two wheels; said evaluation circuit means includes first means for determining the necessary pressure gradients in dependence on said sensed rotary behaviour and second means responsive to said first means for providing said control signals for controlling the position of said hydraulic step-by-step valve; and said step-by-step valve has a plurality of stepping positions corresponding to all possible desirable combinations of pressure gradients in said plurality of brake channels.

3. An anti-lock control system as defined in claim 1 wherein: there are n brake channels; said hydraulic step-by-step valve has one stepping position in which an unthrottled pressure rise is possible in all n brake channels and a plurality of other stepping positions wherein a small pressure rise is provided in (n − 1) brake channels and one of the desired different pressure gradients is provided in the nth brake channel; and said evaluation circuit means is responsive to an output signal from said sensing means indicative of a tendency to lock on the part of the wheel or wheel group associated with said nth channel for producing control signals to position said hydraulic step-by-step valve to the individual stepping positions with different pressure gradients associated with said nth channel to eliminate said tendency to lock.

4. An anti-lock control system as defined in claim 3, wherein said evaluation circuit means includes means for varying said pressure gradient in said nth channel associated with said wheel or wheel group until said sensing means detect that said wheel or wheel group is in a stable state and means to maintain a small pressure rise in the other channels.

5. An anti-lock control system as defined in claim 1, wherein said evaluation circuit means defines a single evaluation channel.

6. An anti-lock control system as defined in claim 5, wherein said sensing means comprises sensors for sensing said rotary behaviour of said at least two wheels and said system further comprises means for feeding output signals of said sensors cyclically one after the other to said single evaluation channel.

7. An anti-lock control system as defined in claim 6 and comprising means for interrupting the cyclic feeding of said output signals of said sensors if the output signal of one of said sensors indicates a tendency to lock on the part of its associated wheel and for restarting said cyclic feeding when said output signal of said one of said sensors indicates that its associated wheel is in a stable state.

8. An anti-lock control system as defined in claim 7, wherein the movable member of the step-by-step valve comprises a plurality of zones, each associated with a brake channel and each having its valve positions for varying brake pressure adjacent in that zone, and wherein means are provided for moving, when a new sensor is switched on, the movable member to a position in which only small movement is necessary to make the single valve positions of the zone corresponding to that sensor effective.

9. An anti-lock control system as defined in claim 1, wherein said step-by-step valve comprises a stator and a rotor rotatable relative thereto.

10. An anti-lock control system as defined in claim 9, and comprising a continuously running drive for said rotor and clutch means for coupling and uncoupling said rotor to and from said drive.

11. An anti-lock control system as defined in claim 10, wherein said drive comprises an electric motor.

12. An anti-lock control system as defined in claim 10, and comprising further devices driven by said drive.

13. An anti-lock control system as defined in claim 10 wherein said clutch means comprises an hydraulically actuated clutch.

14. An anti-lock control system as defined in claim 1, wherein said step-by-step valve comprises a housing and a piston movable in said housing in the longitudinal direction of said housing.

15. An anti-lock control system as defined in claim 14, further comprising an hydraulic drive for said hydraulic step-by-step valve.

16. An anti-lock control system as defined in claim 1, further comprising a pump and a downstream connected pressure reservoir for providing a pressure source for the wheel brakes.

17. An anti-lock control system as defined in claim 16, and comprising two brake circuits and a second smaller downstream connected pressure reservoir, said pump and said first downstream connected pressure reservoir acting as the pressure source for the most important of said two brake circuits and said pump and said second downstream connected pressure reservoir acting as the pressure source for the least important of said two brake circuits.

18. An anti-lock control system as defined in claim 17, and further comprising an electric motor for driving said pump.

19. An anti-lock control system as defined in claim 18 and comprising means driven by said electric motor for driving said hydraulic step-by-step valve.

20. An anti-lock control system as defined in claim 16, and comprising means actuated by said pressure source for driving windshield wipers for said vehicle.

21. An anti-lock control system as defined in claim 17, and comprising means actuated by said pressure source for said most important brake circuit for driving windshield wipers for said vehicle.

22. An anti-lock control system as defined in claim 1 and comprising a piston and cylinder connected to the steering linkage of said vehicle and means for supplying to said piston and cylinder pressure fluid acting on opposite sides of said piston for adjusting said steering linkage.

23. An anti-lock control system as defined in claim 22 and comprising means for supplying pressure fluid from a pressure source provided for brake actuation to one side of the piston in dependence on the actuation of a steering wheel of said vehicle.

24. An anti-lock control system as defined in claim 22 and comprising means for supplying the brake pressures of steered wheels of said vehicle to opposite sides of said piston to compensate said steering linkage for the force acting thereon as a result of different brake pressures at said steered wheels.

* * * * *